United States Patent
Doering

(10) Patent No.: US 6,490,241 B1
(45) Date of Patent: Dec. 3, 2002

(54) SOUND CARRIER FOR A SOUND ILLUSTRATED BOOK

(76) Inventor: Viturin Doering, Normstahlstrasse, D-85366 Moosburg (DE)

( * ) Notice: Subject to any disclaimer, the term of this patent is extended or adjusted under 35 U.S.C. 154(b) by 29 days.

(21) Appl. No.: 09/640,294

(22) Filed: Aug. 16, 2000

(30) Foreign Application Priority Data

Aug. 20, 1999 (DE) .......................................... 199 39 612

(51) Int. Cl.[7] .............................................. G11B 5/84
(52) U.S. Cl. ...................................................... 369/282
(58) Field of Search ........................ 369/282; 360/133, 360/135

(56) References Cited

U.S. PATENT DOCUMENTS

| | | | |
|---|---|---|---|
| 3,883,146 A | 5/1975 | Johnson et al. | 274/9 C |
| 4,298,976 A | 11/1981 | Irvin et al. | 369/282 |

FOREIGN PATENT DOCUMENTS

| | | |
|---|---|---|
| DE | 2358110 | 5/1975 |
| DE | 2701719 | 7/1978 |
| DE | 3133187 | 4/1983 |
| FR | 1.185.057 | 7/1959 |

*Primary Examiner*—Allen Cao
(74) *Attorney, Agent, or Firm*—Webb Ziesenheim Logsdon Orkin & Hanson, P.C.

(57) ABSTRACT

A sound carrier for a sound illustrated book having a spiral shaped sound groove and adjustment perforations arranged outside of the same and symmetrical with its center axis. At least one, but preferably two, of the adjustment perforations are designed in a circular form such that they surround with small clearance aligning feet of a sound reproducing device placed upon the sound carrier which has a rotating sound pickup, whereas other adjacent and opposite adjustment perforations in an upper side of the sound carrier are each surrounded by an upwardly protruding annular bead. This allows at first one or two aligning feet to be inserted into the adjustment perforations, whereupon the sound reproducing device is pivoted so that the two other aligning feet engage the two round adjustment perforations. As a result, it is necessary to monitor one or two adjustment perforations only when placing the sound reproducing device on the sound carrier. The view of adjustment perforations is not impeded by the front side of the sound reproducing device with the arrangement facing the user.

20 Claims, 2 Drawing Sheets

SOUND CARRIER FOR A SOUND ILLUSTRATED BOOK

BACKGROUND OF THE INVENTION

The invention relates to a sound carrier, especially for a sound illustrated book or other printed medium which is to be associated with selected pages of the book or the like. The film-type sound carrier may be inserted, bound or glued into the book. As a separate sound carrier, it may also be connected with a printed medium in a form-stable manner. It may also be designed as a double page and bound into catenae of books. Such sound carriers generally comprise at least one spiral shaped sound groove and at least two, but mostly four, adjustment perforations which are arranged outside of the sound groove area and around the same, in particular symmetrically with respect to the center axis thereof, mostly in the form of round holes. They are dimensioned such that they each surround an aligning foot of a sound reproducing device placed in a pre-aligned position upon the sound carrier with little clearance. The sound reproducing device comprises a sound pickup means which is rotatable about an axis of rotation and is lowered onto the spiral. groove to play it.

The sound carrier may, in addition to the adjustment perforations, also comprise switch-on safeguarding elements for a correctly positioned sound reproducing device which, with its switch-on safeguarding elements provided on its lower side, gets to interact with the same to allow switching on in the correct position only (see German Patent No. 31 33 187 C2).

So-called sounding or sound illustrated books for children, especially for learning purposes, e.g. language learning books, travel books, encyclopedias and the like are known.

During lessons, and especially for private study, everything that is illustrated or written can in this manner be supplemented and deepened by the acoustic information of about 1 to 4 minutes duration contained in the sound groove.

With this type of adjustment or alignment it proved in practice that children or also aged people do not always make the correct association immediately when aligning the sound reproducing device, especially where thick books are involved. To overcome the problem of precisely associating the sound groove with the text in the book itself, and of impaired readability, it is known, as disclosed in German Reference No. PS 2358110, to provide the sound grooves separately on semi-rigid book pages one can turn out. However, this is not satisfactory in many arrangements, especially if the book is large and therefore much space at the side of the book is required. Even if with another, initially mentioned sound illustrated, bound book with bound-in sound carrier films the area available for the sound reproducing device is actually sufficient, the size of the sound reproducing device partially impairs the view, especially if the book is a thick one (German Patent No. 31 33 187 C2). Due to the small permissible tolerance of the feet perforations it happens sometimes that the sound reproducing device is pushed past the adjustment perforations by the aligning feet, so that a repeated re-adjustment is necessary until the correct association is achieved. The aligning feet fit with comparatively little clearance into the perforations so that the device is adjusted exactly concentrically with the sound groove. An inexact adjustment results in obvious sound pitch variations during reproduction. This problem is even greater with bound books, especially at the side of the sound carrier facing the binding. Owing to the normally translucent, crystal-clear sound carrier films it is even more difficult to find the adjustment perforations on a white book page.

It is also known, as identified in U.S. Pat. No. 4,298,976, to provide, for adjustment purposes, a V-shaped depression in the middle of the sound groove of a film-type sound carrier having a thickness of 0.15 to 0.38 mm. The V-base or crown of the sound carrier is engaged by a centering pin of the sound reproducing device. The depth of the depression is 0.127 mm. Additional beads having a height of about 0.127 mm may be provided at the edges of the depressions to make guiding of the centering pin to the base of the V-depression and keeping it in this position easier. This manner of centering did not prove satisfactory because the sound reproducing device had constantly to be held manually in this position which is very difficult especially for children. If it is not held in position, the centering position is left upon a push, a shake or another movement. This is due to the fact that the centering pin is fixed only toward the crown of the V-depression but not in another direction as is the case with the sound carriers mentioned initially where round perforations are provided into which the feet of the sound reproducing device fit with a minor clearance only.

Of similar unreliability is the centering in another known system of a film-type sound carrier with sound reproducing device to be placed upon it as it is described in U.S. Pat. No. 3,883,146. The sound reproducing device comprises two centering pins, spaced apart by e.g. 20 mm. In a first embodiment, they have to be made to abut a side surface of one bead each. The beads are not parallel but are inclined toward each other in funnel-shape. In a second embodiment, two curved oblong holes having a widened section in the middle are provided with which the two centering pins have to be brought into engagement. The two pins that are inserted in the oblong holes get to abut unilaterally a base or crown of the oblong holes by turning the sound reproducing device. There, too, the centering pins have to be held in abutment against the beads or oblong holes as the centering pins are not retained with form-fit by the sound carrier against movement in all directions in the plane of the sound carrier.

The invention is based on the object to make it easier to exactly position the sound reproducing device in the initially mentioned adjustment perforations of a film-type sound carrier having a thickness of about 0.2 to 0.35 mm and to retain the aligning feet of the sound reproducing device in adjustment perforations in such a manner that the sound reproducing device is held safely in all directions after it was centered in the sound carrier plane.

SUMMARY OF THE INVENTION

To meet this object, the invention provides that in the sound carrier mentioned initially at least one of the adjustment perforations on the surface of the sound carrier is surrounded by an annular bead which protrudes in upward direction from the surface and has been impressed or deep-drawn, for example. Said annular bead may either be located immediately at the perforation or surround it a small distance of about 1.0 to 1.5 mm, especially 1.2 mm, thus forming a flat shoulder which contributes to defining the perforation. The annular bead should have a height of 0.2 to 0.3 mm, especially of 0.2 mm, and a width of about 1–1.5 mm, especially 1.2 mm.

It is advisable to provide the two perforations in the lower edge of the sound carrier with such an annular bead. Such an annular bead does not only make the perforations better visible, they also render the alignment of the feet of the sound reproducing device easier because they practically fall into the larger annular bead and slip into the precise adjustment perforations automatically. Such a perforation surrounded by an annular bead can actually be compared to a funnel.

Of course, all the perforations in a sound carrier can be provided with beads. They also prevent an unintentional dislocation of the sound reproducing device during possibly desired interruptions of a reproduction while studying educational information. This is important as the sound reproducing device has to be actuated frequently also during reproduction, for example for interruptions or for a repeated reproduction which naturally involves the danger of dislocation.

As an alternative to this solution, the two lower adjustment perforations may be widened and elongated in the direction away from the other adjustment perforations toward the outside or in the direction of the same toward the inside and surround the respective aligning foot to be inserted into them with large clearance by means of the wide region created in this manner, so that said aligning foot is movable to abut the narrow region and the other aligning foot/feet is/are in a position to engage the other adjustment perforation/perforations in this position. A plane guiding funnel is formed in this manner which passes the sound reproducing device placed in position into the round perforations of the sound carrier.

The walls of the enlarged adjustment perforations should have the same configuration on the side facing toward or away from the other adjustment perforations as the aligning feet to be inserted. As a result, when centered, the feet are in each case in the exactly defined positions in which they would also be if all the perforations were, as is known, circular. The adjustment perforations not made larger should have the common diameter, namely one of about 5–6 mm. The enlarged perforations have by nearly their halves the same configuration from where they widen and are extended to reach a larger transverse dimension of about 9–10 mm. The adjustment perforations are open toward the underside of the sound carrier. Actually, two adjustment perforations of which one is circular and the other funnel-shaped are sufficient for the alignment. Nevertheless, mostly four perforations are provided, as has been done previously, of which two are widened to funnel shape.

Where sound carriers have to be bound or glued into books or have otherwise to be arranged close to the binding, it is advisable to arrange the beads or the enlarged adjustment perforations on the side of the sound groove that faces away from the binding of the book because there the view thereto is best and the pages are not so much curved, so that the feet in the perforations can be shifted to the narrower base and the sound reproducing device can then be pivoted out through the other perforations and placed over the sound carrier.

The embodiment with the widening adjustment perforations is of importance where the sound carriers are glued or bound into printed media by automatic machines, so that they do not have a thickened portion either at the top or the bottom side, and a stack of sound carriers is not set up on one side. The editor can decide which type of adjustment perforations is the best for his printed medium.

Insertion of the sound reproducing device in the adjustment perforations is still rendered easier and, moreover, placement onto the front side of the sound carrier guaranteed if, in accordance with another embodiment, the sound carrier has on its rear side a coating partially transparent at most. The coating may be a color coating or a film coating or a coating of a dyed adhesive. Aluminum films rolled on without folds also proved to make good films. Thus the sound carriers look very much like the known compact discs (CDs). Sound carriers coated in this manner which might have different colors have the additional advantage in books that they can easily be noticed and may also be associated with different fields or topics.

For being fastened, the individual sound carriers which may upon the user's discretion be glued at the places provided in the book have a coating of adhesive, which, in turn is protected by a stripfilm. Some sound carriers are especially used for children's books or for texts which require explanation. To prevent that a printing company has to print two different books, the sound carriers are supplied along with the respective books the customer has ordered. As a further alternative, the sound carriers may also be issued in the form of postcards for being filed or glued into periodicals and/or in the form of cards with two-sided impression for collecting purposes.

The manner of fastening the films in books or other printed media, including periodicals, depends exclusively on the intended purpose of the printed medium and the sound carriers. Postcard-size sound carriers may be glued all over their size e.g. into children's books. When they are provided with an adhesive strip at the edge, they may also be glued in periodicals as this is already being done with postcards and brochures.

Embodiments of the invention will be described in greater detail below with reference to the drawings.

BRIEF DESCRIPTION OF THE DRAWINGS

FIG. 1.1 shows an enlarged section of the annular bead according to FIG. 1, without a shoulder within the bead opening;

FIG. 3.1 shows an enlarged section of the annular bead of FIG. 3 with a shoulder having a width of 1.20 mm within the bead opening.

DETAILED DESCRIPTION OF THE PREFERRED EMBODIMENTS

Figure 1:
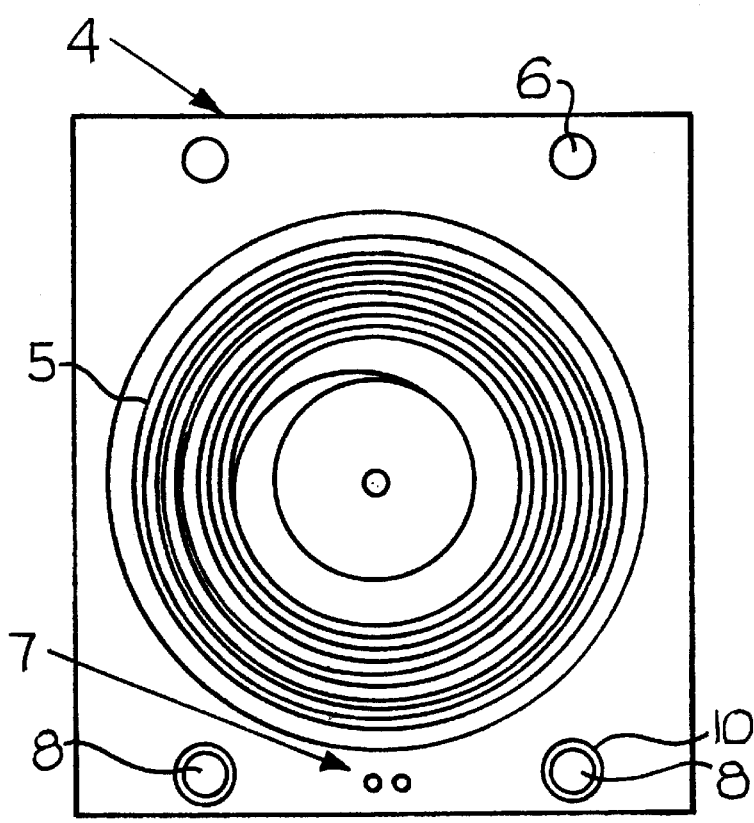
FIG. 1 shows a sound carrier with four perforations, the lower two of which are provided with an annular bead.

A rectangular, film-type sound carrier 4 having a thickness of about 0.2 to 0.3 mm and made of a transparent plastics material as illustrated in FIG. 1 includes a spiral shaped sound groove 5 adapted to be scanned by a circulating sound pickup of a sound reproducing device which is adapted to be placed over the sound carrier 4 with aligning feet. The sound carrier to be glued onto a book page has on its rear side e.g. a pressure curing adhesive coating. The sound carrier 4 whose outlines are shown in FIG. 1 includes, equally distributed on the circumference, mostly at the top of the figures, two adjacent, conventional circular adjustment perforations 6 and two further adjacent adjustment perforations 8 at the bottom. Switch-on safeguarding elements 7 in the form of adjacent engravings and imprints may in a known manner be provided between the lower adjustment perforations. While the upper adjustment perforations 6 have only a circular configuration with a diameter of from 5 to 6 mm, the lower adjustment perforations 8 are surrounded by an annular bead directly adjacent the circular adjustment perforation or bead opening 9, as shows the cross-section shown in FIG. 1.1.

Figure 2:
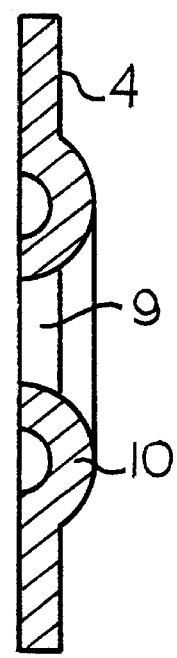
FIG. 2 shows a sound carrier with four perforations, whereof the lower two perforations are provided with one oblong, obliquely extending bead each on opposite sides, which beads extend toward each other in downward direction and jointly form an oblique guide funnel.
Figure 2:
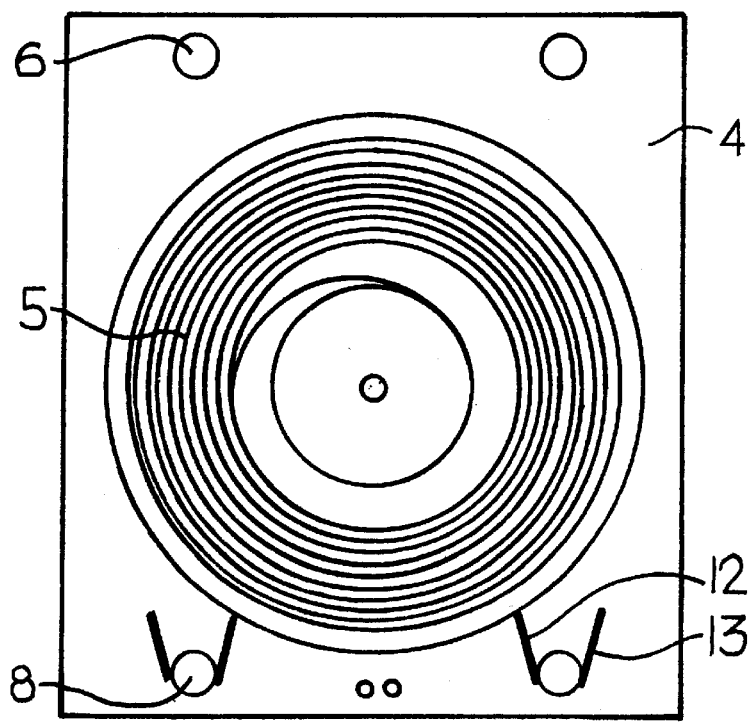

Instead of an annular bead surrounding the adjustment perforations 8, the embodiment of FIG. 2 shows embossed and deep-drawn straight beads 12 and 13 on opposite sides which are arranged obliquely with respect to each other, project in upward direction and together form a funnel ending approximately at the center line. Said funnel is in a position to guide the aligning foot of the sound reproducing device into the round perforation 8 when the sound reproducing device is placed on the sound carrier.

Figure 3:
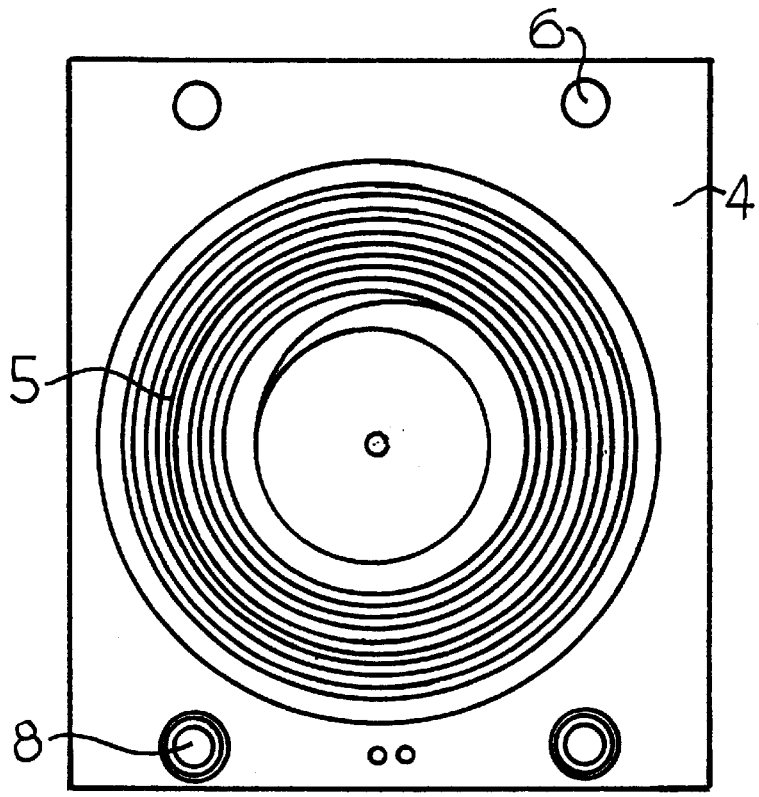
FIG. 3 shows a sound carrier similar to that of FIG. 1, in which a narrow shoulder projecting inwardly by about 1.2 mm was still left within the bead opening.

The embodiment of FIG. 3 differs from that of FIG. 1 merely in that the annular bead 10 surrounds the bead opening 9 at a small distance of 1 to 1.5 mm, preferably about 1.2 mm. A shoulder 11 clearly visible in the cross-section shown in FIG. 3.1 results. This makes the construction of the embossing tool for making the annular bead easier and the shape of the perforation 8 can be made with more accuracy.

Figure 4:
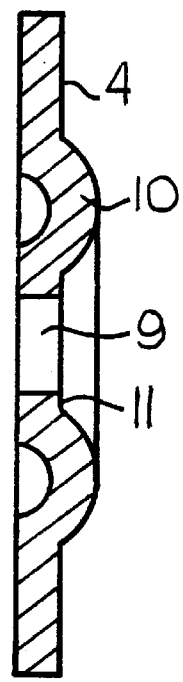
FIG. 4 shows a sound carrier with four perforations, the lower two adjustment perforations of which are enlarged to funnel shape.
Figure 4:
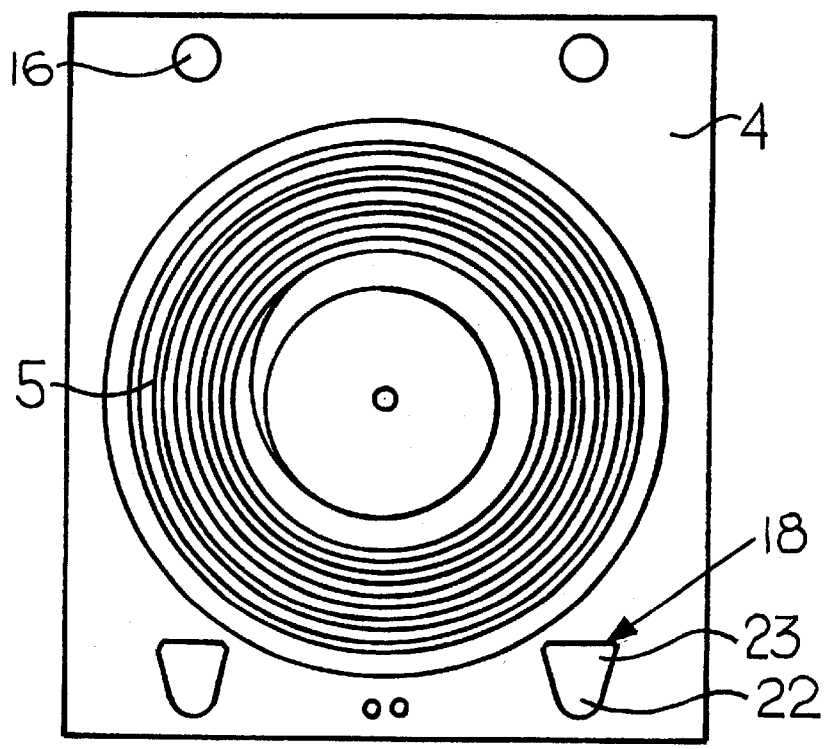

The sound carrier 4 illustrated in FIG. 4 is provided with two conventional circular adjustment perforations 16 on the top and two further adjacent round adjustment perforations 18 at the bottom which are equally distributed on the circumference. While the upper adjustment perforations 16 have only a circular configuration and a diameter of from 5 to 6 mm, the lower adjustment perforations 18 are funnel-shaped and become wider in the direction of the upper, round perforations up to a greatest width of about 9–10 mm. A narrow region 22, see FIG. 4, has the same curvature as the circular perforations 16. It is located where the round aligning feet of a sound reproducing device placed upon a sound carrier are when the round aligning legs engage the round adjustment perforations 16.

When placing the sound reproducing device on the sound carrier, the respective aligning feet either are inserted in the annular beads 10 in the wide region or the perforation 18 and moved toward the narrow region 12 for abutting the perforation base, whereupon the sound reproducing device is pivoted to the two circular upper perforations 6 and 16, respectively, over the sound carrier. In doing so, the two round aligning feet should directly engage in the round adjustment perforations and stand on the support (page etc.) of the sound carrier. A minor correction of the position might be necessary which can also be made blindly.

It is advisable for the round adjustment perforations 6 and 16, respectively, to face the binding of the book and to be arranged in parallel with the book's spine so that the sound reproducing device can be placed upon the sound carrier in a region of the book's page which normally is not curved too much. If the device were placed upon the sound carrier on the inner side of the book, i.e. close to the binding, it may well be possible that the two other feet do not engage the adjustment perforations. On an opposite page the sound grooves with the adjustment apertures would be arranged in mirror-inverted fashion.

It is possible to accommodate in a known manner all sound carriers with the adjustment perforations on one leaf, as disclosed in German Patent No. 31 33 187 C2, incorporated herein by reference, and to arrange the adjustment perforations in the same position in each case.

If the sound reproducing device is provided with switch-on safeguarding elements 7, switch-on safeguarding knobs and engravings are provided in a known manner between the lower adjustment perforations 18.

The funnel-shaped adjustment perforations 18 may also be designed such that they are turned with respect to the sound carrier by 180° about the center of curvature of the narrow region 22. It is not of much consequence for the placement on the sound carrier whether the sound reproducing device is enlarged and elongated toward the first adjustment perforations or away from the same. The exactly aligned placement of the sound reproducing device upon the sound carrier is made easier in either case. The embodiment illustrated in FIG. 4 is the preferred one, however.

As was said in the beginning, the sound carriers may have a color coating or may be colored to render the placement of the sound reproducing device onto the sound carrier easier due to the color contrast with respect to the leaf.

What is claimed is:

1. A sheet-shaped sound carrier, especially for a sound illustrated book, which is to be associated with selected pages and has on its front side at least one spiral shaped sound groove and at least two adjustment perforations which are arranged outside of the sound groove and around the same symmetrically with respect to a center axis thereof, and are dimensioned such that the at least two adjustment perforations each receive an aligning foot of a sound reproducing device placed in a pre-aligned position upon the sound carrier, the reproducing device having a pickup means rotatable about an axis of rotation in an aligned position in which the center axis of the sound groove and the axis of rotation of the sound pickup means coincide, wherein at least one of the adjustment perforations is surrounded by an upwardly projecting annular bead on a surface of the sound carrier.

2. The sound carrier according to claim 1, wherein each annular bead surrounds the adjustment perforation at a distance of about 1–1.5 mm leaving a shoulder between the perforation and the bead.

3. The sound carrier according to claim 2, wherein each annular bead surrounds the adjustment perforation at a distance of about 1.2 mm.

4. The sound carrier according to claim 1, wherein each annular bead has a height of about 0.2 to 0.3 mm and a width of about 1.0 to 1.3 mm above the surface of the sound carrier.

5. The sound carrier according to claim 1, wherein the annular beads are provided for all the adjustment perforations.

6. The sound carrier according to claim 1, wherein the said carrier is made of one of clear and translucent plastics material, and wherein a rear side of the sound carrier is provided with a partially transparent coating.

7. The sound carrier according to claim 6, wherein the coating is a color coating.

8. The sound carrier according to claim 6, wherein the coating is a film coating.

9. The sound carrier according to claim 8, wherein the film coating comprises an aluminum film.

10. The sound carrier according to claim 6, wherein the coating is a layer of a dyed adhesive.

11. A sheet-shaped sound carrier especially for a sound illustrated book, which is to be associated with selected pages and has on its front side at least one spiral shaped sound groove and at least two adjustment perforations which are arranged outside of the sound groove area and around the same symmetrically with respect to a center axis thereof, and are dimensioned such that the at least two adjustment perforations each receive an aligned foot of a sound reproducing device placed in a pre-aligned position upon the sound carrier, the reproducing device having a pickup means rotatable about an axis of rotation in an aligning position in which the center axis of the sound groove and the axis of rotation of the sound pickup means coincide, wherein at least one of the adjustment perforations of the sound carrier is provided on its front side with oblong beads which are arranged obliquely with respect to each other on opposite sides of each perforation, and which project in an upward direction and form a funnel that is adapted to lead the aligning foot into the adjustment perforation.

12. The sound carrier according to claim 11, wherein when the sound carrier is to be bound into a book close to a binding of the book, the oblong beads are arranged on a side of the sound groove facing away from the binding.

13. The sound carrier according to claim 11, wherein each oblong bead has a height of about 0.2 to 0.3 mm and a width of about 1.0 to 1.3 mm above the surface of the sound carrier.

14. The sound carrier according to claim 11, wherein the oblong beads are provided for all the adjustment perforations.

15. A sound carrier, especially for a sound illustrated book, which is to be associated with selected pages and has on its front side in each case at least one spiral shaped sound groove and at least two adjustment perforations which are arranged outside of the sound groove and around the same symmetrically with respect to a center axis thereof, and are dimensioned such that the at least two adjustment perforations each receive an aligning foot of a sound reproducing device placed in a pre-aligned position upon the sound carrier, the reproducing device having a pickup means rotatable about an axis of rotation in an aligned position in which the center axis of the sound groove and the axis of rotation of the pickup means coincide, wherein at least one of the adjustment perforations is extended and widened in a direction away from the other adjustment perforations to form a wide region and a narrow region and surrounds the aligning foot to be inserted into it, with the wide region thus made with sufficient clearance such that said aligning foot is movable to abut the narrow region, and other aligning feet in this position are able to engage into other adjustment perforations.

16. The sound carrier according to claim 15, wherein each extended and widened adjustment perforation is tapered from the wide region to the narrow region.

17. The sound carrier according to claim 16, wherein walls of the extended and widened adjustment perforations have on a side facing one of toward and away from the other adjustment perforations the same configuration as the aligning feet to be inserted.

18. The sound carrier according to claim 15, wherein walls of the extended and widened adjustment perforations have on a side facing one of toward and away from the other adjustment perforations the same configuration as the aligning feet to be inserted.

19. The sound carrier according to claim 15, wherein the narrow region of the extended and widened adjustment perforations has a radius of curvature of about 2.5 to 3 mm and the wide region has a width of about 9 to 1.0 mm.

20. The sound carrier according to claim 15, wherein when the sound carrier is to be bound into a book close to a binding of the book, the extended and widened adjustment perforations are arranged on a side of the sound groove facing away from the binding.

* * * * *

UNITED STATES PATENT AND TRADEMARK OFFICE
CERTIFICATE OF CORRECTION

PATENT NO. : 6,490,241 B1
DATED : December 3, 2002
INVENTOR(S) : Viturin Doering It is certified that error appears in the above-identified patent and that said Letters Patent is hereby corrected as shown below:

Column 1,
Line 24, "spiral." should read -- spiral --.

Column 8,
Line 29, "1.0 mm" should read -- 10 mm --.

Signed and Sealed this

Seventeenth Day of June, 2003

JAMES E. ROGAN
*Director of the United States Patent and Trademark Office*